United States Patent [19]
Capozza

[11] 3,907,677
[45] Sept. 23, 1975

[54] REGULAR ALTERNATING COPOLYMERS OF STYRENE AND IMIDAZOLINES AND THEIR DERIVATIVES

[75] Inventor: Richard Carl Capozza, Norwalk, Conn.

[73] Assignee: American Cyanamid Company, Stamford, Conn.

[22] Filed: May 22, 1974

[21] Appl. No.: 472,339

Related U.S. Application Data
[62] Division of Ser. No. 399,673, Sept. 21, 1973, Pat. No. 3,826,787.

[52] U.S. Cl. .................................. 210/54; 210/10
[51] Int. Cl. .......................................... B01d 21/01
[58] Field of Search ................................. 162/168; 210/52–54, 10; 260/85.5 R, 85.5 B, 85.5 S, 79.3 R

[56] References Cited
UNITED STATES PATENTS

| | | | |
|---|---|---|---|
| 3,772,259 | 11/1973 | Williams et al. | 260/88.7 R |
| 3,826,787 | 7/1974 | Capozza | 260/85.5 R |

*Primary Examiner*—Samih N. Zaharna
*Assistant Examiner*—Peter A. Hruskoci
*Attorney, Agent, or Firm*—Frank M. Van Riet

[57] ABSTRACT

Completely alternating (1:1) copolymers of styrene and various imidazolines, their salt derivatives and methods of treating aqueous suspensions of water-insoluble, solid materials therewith, are disclosed.

4 Claims, 1 Drawing Figure

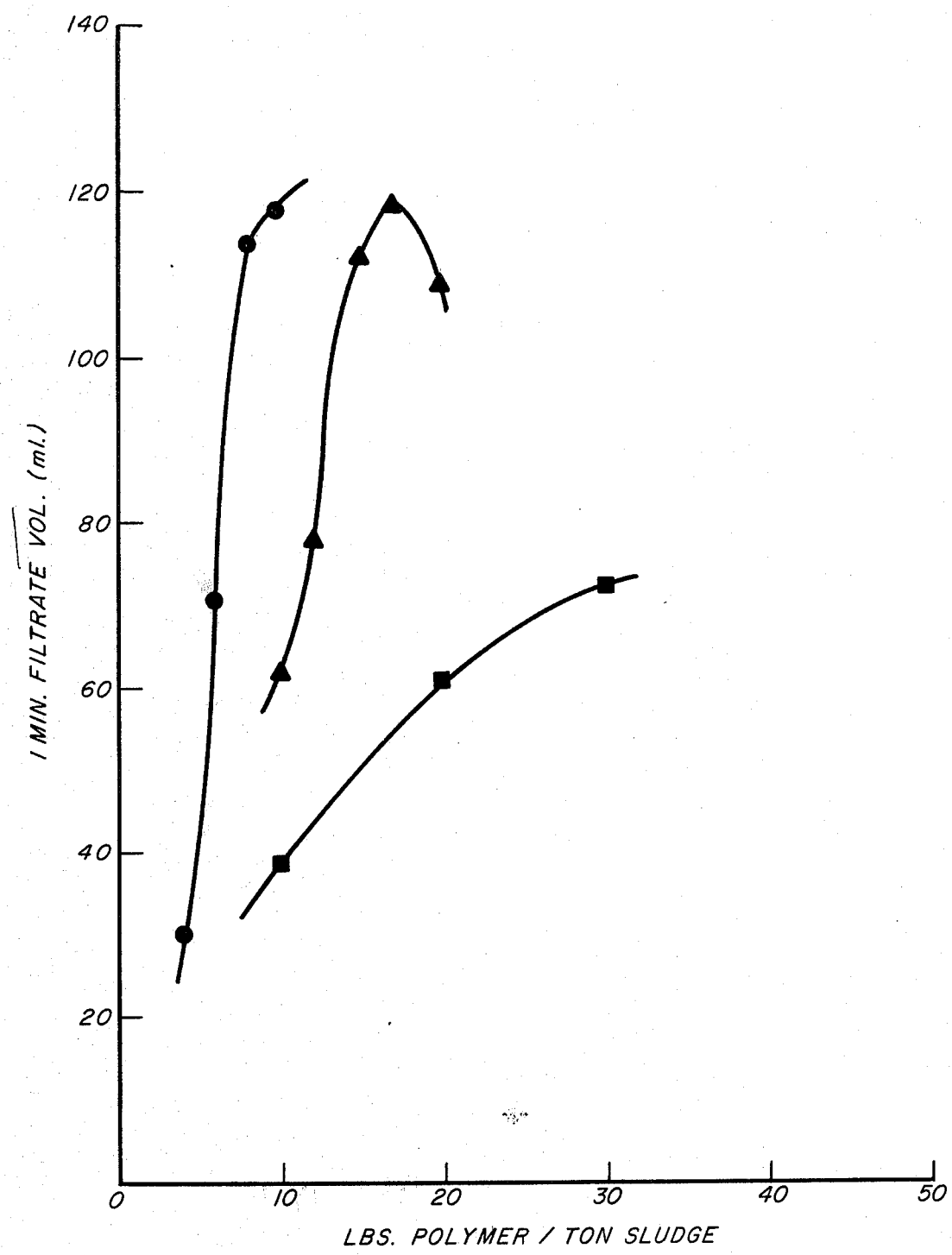

REGULAR ALTERNATING COPOLYMERS OF STYRENE AND IMIDAZOLINES AND THEIR DERIVATIVES

This is a division of application Ser. No. 399,673 filed 9/21/73, now U.S. Pat. No. 3,826,787.

BACKGROUND OF THE INVENTION

The need for high-efficiency products for use in the treatment of aqueous suspensions of particulate, solid, water-insoluble materials has become increasingly acute in recent years. Industry is therefore continually searching for new systems which can be used to facilitate the dewatering of aqueous suspensions of organic or mixtures of organic and inorganic materials e.g. such industrial wastes as distillery wastes, fermentation wastes, wastes from paper manufacturing plants, dye plant wastes, and sewage suspensions such as digested sludges, activated sludges or raw or primary sludges from sewage treatment plants and the like.

One of the most successful materials used in the treatment of such suspensions has been a salt of polyvinylimidazoline. This material is disclosed in U.S. Pat. No. 3,406,139, which patent is hereby incorporated herein by reference. The polyvinylimidazoline salt is an effective flocculating agent which has found use in the treatment of industrial wastes. Although successful, industry is continually searching for other systems which may be as effective or more effective or more economically feasible than available systems.

SUMMARY OF THE INVENTION

I have now found a new copolymeric system which is more effective than most commercially available materials in the flocculation of sewage and industrial sludges, water clarification, and in the settling of mine effluents.

This new copolymeric system is based on a copolymer of styrene and various imidazolines. Since it contains imidazoline linkages, it is structurally related to the polyvinylimidazoline system discussed above. However, since it is a copolymer, the number of imidazoline units in the material is materially reduced from the number in the homopolymer. As a result, the copolymeric system of the present invention is more economical. Furthermore, the salts of the novel completely alternating (1:1) copolymers of this invention unexpectedly perform better in water treatment tests salts of random styrene-imidazoline copolymers of similar molecular weight and monomer concentration.

My novel copolymers also find use as paper retention aids in paper making procedures.

DESCRIPTION OF THE DRAWING

The drawing is a graphic representation of the efficiency of salts of the instant copolymer as against those of a random copolymer of substantially the same molecular weight and monomer composition and a commercially available flocculation agent composed of a salt of polyvinylimidazoline.

The efficiency of the instant copolymeric salt systems is shown in the graph by the triangle △ symbol, the homopolymeric imidazoline salt by the circle ○ symbol and a random copolymer of styrene and imidazoline salt by the square ☐ symbol. The graph is a plot of the results of Example 3, below, the materials having been used to treat Greenwich, Connecticut digested sewage sludge. The pounds of polymer per ton of sludge used is shown along with the volume in milliliters of filtrate recovered after 1 minute of filtration.

DESCRIPTION OF THE INVENTION INCLUDING PREFERRED EMBODIMENTS

The novel copolymers of the instant invention are completely alternating. That is to say, they are alternating repeating results of styrene and imidazoline or pyrimidine moieties that are present in the copolymer as ... ABABABABAB ... units.

These novel copolymers have completely alternating (1:1) units of the formula

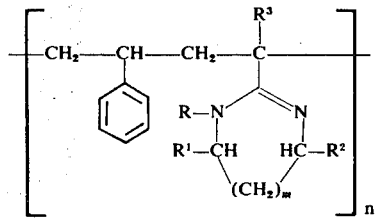

wherein $m$ is 0 or 1, R, $R^1$ and $R^2$ are, individually, hydrogen, lower alkyl ($C_1-C_4$), aryl ($C_6-C_{10}$), aralkyl ($C_7-C_{11}$) or alkaryl ($C_7-C_{11}$) radicals $R^3$ is hydrogen or methyl and n is at least about 50.

By the term "imidazoline", as used herein is meant not only the structure of the above formula when $m$ is 0, but also the structure when $m$ is 1, i.e. pyrimidines.

R, $R^1$ and $R^2$ may be any branched or straight chain alkyl group such as methyl, ethyl, butyl, isopropyl etc. or benzyl, phenyl, ethyl benzyl, phenethyl group or the like.

My novel copolymer may contain alternating vinylimidazoline and pyrimidine groups. Substituents R, $R^1$ and $R^2$ may all be the same or they may all be different.

The completely alternating copolymers of my invention are produced from completely alternating copolymers of styrene and acrylonitrile. The styrene-acrylonitrile alternating copolymer charge materials are well known to those skilled in the art and may be prepared by any known method such as those described by Gaylord et al., Macromolecules, Vol. 2, page 442 et seq., 1969; and Ikegami et al., Journal of Polymer Science, Part A-1, Vol. 8, pages 195–208, 1970, which articles are hereby expressly and explicitly incorporated herein by reference.

The styrene-acrylonitrile alternating copolymers are produced with a substantially 1:1 ratio of styrene and acrylonitrile units therein. They are relatively high in molecular weight and are easily handled for use in the manufacture of the novel copolymers of the instant invention.

My novel copolymers are produced by reacting an alternating styrene-acrylonitrile copolymer with a polyamine under the conditions disclosed in U.S. Pat. No. 3,406,139, mentioned above. The typical polyamines set forth therein at column 4, line 60 to column 5, line 2, can also be used herein with such polyamines as ethylenediamine, 1,2-diaminopropane and the like being exemplary. Mixtures may also be used.

The polyamine reaction is preferably carried out at reflux temperatures for up to about 72 hours in the presence of a catalyst such as elemental sulfur, although temperatures ranging from about 70°C. to the amine boiling point are permissible. The conditions set out in the above U.S. patent at column 5, line 8 to column 6, line 57 are specifically applicable.

As set forth in the above generic formula, n must be at least about 50. This value results in a molecular weight which renders the salts of the novel copolymers of the instant invention suitable for the water treatment procedures specified above.

Generally, I have found that the molecular weight of my copolymers must be at least about 50,000 to be effective and can range as high as 50 million, although such high values are not usually required. Preferred molecular weight for water treatment may range from 500,000 to 10 million.

The novel copolymers hereof also find use as intermediates in the preparation of the salts thereof which have proven to be the most successful materials for use in the flocculation of sludges etc.

As mentioned above, the instant invention also encompasses salts of the instant copolymers having the formula

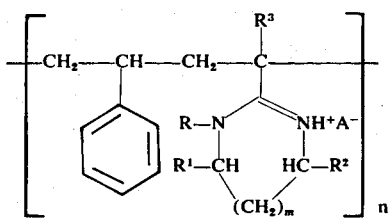

wherein $A^-$ is an anion, i.e. a negative salt forming ion or radical such as a halide e.g. chloride, bromide, iodide etc.; a sulfate; a sulfite; a bisulfite; a bisulfate; an acetate; a tartrate; a propionate; a biphosphate; a citrate; a phosphate; a sulfonate; an oxalate and the like.

These salts may be prepared by treating my novel alternating copolymers with an organic or inorganic acid such as sulfuric, phosphoric, etc. to produce the corresponding salt. Acid salts may also be used for this purpose.

The use of my novel alternating copolymer salts to separate water from an aqueous suspension of inorganic or mineral matter such as clay etc. has been mentioned briefly above. More particularly, they may be used to treat suspensions of pH ranging from 0–11 and they may be used alone or in conjunction with other flocculating agents such as acids, starches, natural and synthetic gums in order to reduce the holding time in settling tanks etc. before the supernatant liquor can be removed.

My novel polymeric salts can be added to such systems requiring dewatering in amounts ranging from about 0.001% to about 5.0%, by weight, based on the weight of the suspended matter in the system being treated. The nature and amount of suspended matter, the speed of flocculation desired, the particular system being treated and the size particle being flocculated or the surface area thereof all influence the amount of my alternating copolymer salt which must be used.

The following examples are set forth for purpose of illustration only and are not to be construed as limitations on the present invention except as set forth in the appended claims. All parts and percentages are by weight unless otherwise specified.

EXAMPLE 1

A. PREPARATION OF STYRENE-ACRYLONITRILE ALTERNATING COPOLYMER

Into a three-necked vessel fitted with stirrer, thermometer and nitrogen purge is placed 125 ml of dry benzene, 26.6 parts of acrylonitrile and 34.0 parts of zinc chloride. The vessel is purged with nitrogen for 45 minutes and 52.1 parts of styrene are then added. Polymerization occurs immediately, the temperature ranging from about 17–32°C. over a period of 2.75 hours. The resultant polymer is a sticky mass which is washed with a methanol-hydrochloric acid mixture. The yield of product (dry) is 53.4 parts or 67.6%. The crude polymer is dissolved in chloroform, reprecipitated from methanol and dried. The intrinsic viscosity is 1.82 in dimethylformamide at 30°C. corresponding to a weight average molecular weight of about 160,000. Pulsed $^{13}$C NMR indicates a 50/50 completely alternating copolymer of styrene and acrylonitrile.

B. PREPARATION OF STYRENE-IMIDAZOLINE ALTERNATING COPOLYMER SALT

A three-necked vessel, fitted with stirrer, reflux condenser, thermometer and nitrogen purge, is charged with 5 parts of the styrene-acrylonitrile copolymer of Part A, above. To the vessel are then added 40 ml of ethylenediamine and 0.05 part of sulfur. The resultant solution is heated to reflux for 72 hours, the vessel cooled and the solution poured into water. A white precipitate is collected by filtration and dried at 40°C. overnight. The precipitate is analyzed and found to be an alternating copolymer of styrene and imidazoline of weight average molecular weight of about 200,000. A solution of the polymer is prepared by adding 4 parts of glacial acetic acid to a water suspension thereof to form the acetate salt. This solution can be cast into films which are clear, hygroscopic and readily soluble in water.

EXAMPLE 2 (COMPARATIVE)

A. PREPARATION OF STYRENE-IMIDAZOLINE RANDOM COPOLYMER

Into a vessel are charged 57.4 ml of styrene, 33.4 ml of acrylonitrile and 0.79 part of azobisisbutyronitrile. The vessel is frozen in dry ice/acetone and evacuated on an all glass vacuum line. The freeze-evacuate cycle is repeated thrice and the vessel is then sealed. Polymerization is allowed to occur at 80°C. for 18 hours and the seal is then broken. The resultant polymer is dissolved in dichloromethane and subsequently precipitated from methanol. The resultant polymer is dried in vacuo at 40°C. The intrinsic viscosity is 1.98 in dimethylformamide at 30°C. corresponding to a weight average molecular weight substantially equivalent to the copolymer of Example 1B. Analysis shows approximately a 50/50 random copolymer.

B. PREPARATION OF A RANDOM STYRENE-IMIDAZOLINE COPOLYMER SALT

The procedure of Example 1B is again followed except that the charge polymer is the random copolymer of Example 2A. A random copolymer acetate salt of styrene-imidazoline is recovered.

EXAMPLE 3

Into a suitable vessel is measured 150 ml of Greenwich, Conn. sewage sludge. The required volume of flocculant solution is measured by drawing it into a 30 ml hypodermic syringe. The sludge is stirred with an umbrella stirrer at 200 rpm. A timer is then started and the flocculant polymer is rapidly injected into the sludge while stirring. After 30 seconds the stirrer is stopped. The sludge is allowed to stand an additional thirty seconds and then is poured into a Buchner Funnel. A vacuum of 20 mm is pulled on the funnel. The timer is started and the volume of filtrate is measured as a function of time.

The following tables represent the filtration volumes at one minute of a range of polymer dosages of the polymers of Examples 1B and 2B, above, and a commercially available homopolymeric imidazoline salt after treating the Greenwich, Conn. sewage solids at 5.5%.

TABLE I

| Polymer Dose | lbs/ton | 1 min filtrate vol (ml) |
|---|---|---|
| Homopolymeric Imidazoline Salt-(0.3%)-O | | |
| 10 | 3.8 | 30 |
| 15 | 5.6 | 71 |
| 20 | 7.5 | 115 |
| 25 | 9.4 | 118 |
| Alternating Copolymer of Example 1B-(0.30%)- Δ | | |
| 10 | 9.4 | 62 |
| 12 | 11.2 | 78 |
| 15 | 14.0 | 113 |
| 17 | 15.8 | 120 |
| 20 | 18.6 | 109 |
| Random Copolymer of Example 2B-(0.3%)-☐ | | |
| 10 | 9.4 | 39 |
| 20 | 18.6 | 61 |
| 30 | 28.0 | 72 |

These values are then plotted on a graph as shown in the drawing by the above specified symbols.

EXAMPLES 4–10

Following the procedure of Example 1B, alternating copolymers of styrene and acrylonitrile are contacted with various polyamines in order to form the corresponding styrene-imidazoline alternating copolymers. The polyamines used are (4) 1,3-propanediamine to produce the 3,4,5,6-tetrahydropyrimidine, (5) N-methylethylenediamine to produce the N-methylimidazoline, (6) 1,2-diaminobutane to produce the 2-ethylimidazoline, (7) N-phenyl-1,3-diaminopropane to produce the N-phenyl-3,4,5,6-tetrahydropyrimidine, (8) 2,3-diaminobutane to produce the 4,5-dimethylimidazoline (9) 4-phenyl-2,3-diaminobutane to produce the 4-methyl-5-benzylimidazoline and (10) 1-tolyl-1,2-diaminoethane to produce the 4-tolylimidazoline.

EXAMPLES 11–14

Salts of the alternating styrene-imidazoline copolymer of Example 1B are prepared by eliminating the acetic acid solution production and dissolving 10 part portions of the copolymer instead in 11 aqueous (15%) sulfuric acid to produce the sulfate, 12 aqueous hydrochloric acid to produce the hydrochloride, 13 oxalic acid to produce the oxalate and 14 aqueous phosphoric acid to produce the phosphate. Upon treating a water suspension therewith as in Example 3, similar results were achieved with each of these four salts.

EXAMPLE 15

The procedure of Examples 1A and 1B are again followed except that the acrylonitrile charge is replaced by methacrylonitrile. Again an alternating 1:1 copolymer is produced. The imidazoline is formed therefrom using ethylenediamine and the salt thereof is prepared by replacing the acetic acid solution with a sulfamic acid solution. The resulting sulfamate exhibits excellent flocculating abilities when used to contact sewage sludge as in Example 3.

EXAMPLES 16–19

Use of the copolymer salt of Example 1B to treat 16 an iron ore suspension, 17 a 7.5% clay slurry, 18 a paper plant sludge and 19 digested sewage sludge of 8.7% solids, resulted, in each instance, in an effective dewatering thereof.

I claim:

1. A process for dewatering an aqueous suspension which comprises mixing an aqueous suspension of an organic or inorganic, water-insoluble, particulate material with an effective amount of a polymer salt having completely alternating 1:1 units of the formula

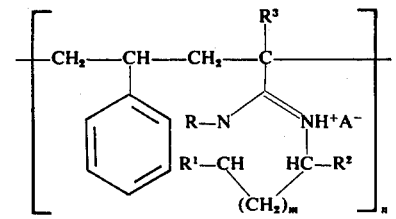

wherein $A^-$ is an anion, $m$ is 0 or 1, R, $R^1$ and $R^2$ are, individually, hydrogen, lower alkyl ($C_1$–$C_4$), aryl ($C_6$–$C_{10}$), aralkyl ($C_7$–$C_{11}$) or alkaryl ($C_7$–$C_{11}$), $R^3$ is hydrogen or methyl and $n$ is at least about 50 and separating the particulate material from the suspension.

2. A method according to claim 1 wherein R, $R^1$, $R^2$ and $R^3$ are hydrogen, $m$ is 0 and $A^-$ is an acetate anion.

3. A method according to claim 1 wherein R, $R^1$, $R^2$ and $R^3$ are hydrogen, $m$ is 0 and $A^-$ is a sulfate anion.

4. A method according to claim 1 wherein R, $R^1$, $R^2$ and $R^3$ are hydrogen, $m$ is 0 and $A^-$ is a phosphate anion.

* * * * *